US008849266B2

(12) United States Patent
Mathieu et al.

(10) Patent No.: US 8,849,266 B2
(45) Date of Patent: Sep. 30, 2014

(54) METHOD FOR ENSURING CONTINUITY DURING THE MANAGEMENT OF COMMUNICATION SESSIONS OPERATED FROM A FOURTH-GENERATION MOBILE TERMINAL

(75) Inventors: Christophe Mathieu, Velizy Cedex (FR); Natael Martinez, Velizy Cedex (FR)

(73) Assignee: Thales, Neuilly sur Seine (FR)

( * ) Notice: Subject to any disclaimer, the term of this patent is extended or adjusted under 35 U.S.C. 154(b) by 127 days.

(21) Appl. No.: 13/513,192

(22) PCT Filed: Nov. 9, 2010

(86) PCT No.: PCT/EP2010/067121
§ 371 (c)(1),
(2), (4) Date: Oct. 5, 2012

(87) PCT Pub. No.: WO2011/067077
PCT Pub. Date: Jun. 9, 2011

(65) Prior Publication Data
US 2013/0122879 A1 May 16, 2013

(30) Foreign Application Priority Data
Dec. 1, 2009 (FR) ...................................... 09 05791

(51) Int. Cl.
*H04M 1/66* (2006.01)
*H04L 29/06* (2006.01)
*H04W 36/00* (2009.01)
*H04L 12/911* (2013.01)
*H04L 12/919* (2013.01)

(52) U.S. Cl.
CPC ....... *H04W 36/0011* (2013.01); *H04L 65/1006* (2013.01); *H04L 47/783* (2013.01); *H04L 65/1083* (2013.01); *H04L 47/824* (2013.01); *H04L 47/767* (2013.01)
USPC ...................................................... 455/416

(58) Field of Classification Search
CPC .......... H04Q 7/20; H04Q 7/00; H04W 88/16; H04W 36/0011
USPC .......... 455/436, 433, 416; 370/331, 338, 329, 370/352, 241, 351
See application file for complete search history.

(56) References Cited

U.S. PATENT DOCUMENTS

2006/0258356 A1* 11/2006 Maxwell et al. ............... 455/436
2007/0060127 A1* 3/2007 Forsberg ....................... 455/436
(Continued)

FOREIGN PATENT DOCUMENTS

WO 2008/033381 A2 3/2008

OTHER PUBLICATIONS

R. Farahbakhsh et al.: "Using Context Transfer Mechanisms to Improve Mobile IMS-IPv6 Handover Latency and QoS Provisioning," Internet Multimedia Services Architecture and Applications, 2008. IMSAA 2008. 2nd International Conference on, IEEE, Piscataway, NJ, USA, Dec. 10, 2008, pp. 1-6.

(Continued)

*Primary Examiner* — Kiet Doan
(74) *Attorney, Agent, or Firm* — Baker & Hostetler LLP

(57) ABSTRACT

A method ensuring continuity of management of communications sessions operated from a fourth-generation mobile terminal communicating on an IP network including at least one radio network with a plurality of base stations with which said terminal is capable of communicating, said radio network connected via access gateways to an interconnection network with communications session management application servers, the sessions of a mobile terminal being managed by one of said servers, the method including: in the event of a movement of the mobile terminal resulting in a change of access gateway, the new gateway transmits an alert message to a new management server; the new management server transmits an interrogation request to the other servers in order to recover the call context of the mobile terminal; and the new server transmits an invitation to the mobile terminal accompanied by connection parameters, such that said terminal can connect to the new server.

7 Claims, 3 Drawing Sheets

(56) References Cited

U.S. PATENT DOCUMENTS

2007/0265000 A1* 11/2007 Hanson et al. ............. 455/432.1
2009/0156213 A1* 6/2009 Spinelli et al. ................ 455/436

OTHER PUBLICATIONS

S. Pack et al.: "SAMP: Scalable Application-Layer Mobility Protocol," IEEE Communications Magazine, IEEE Service Center, Piscataway, US, vol. 44, No. 6, Jun. 1, 2006, pp. 86-92.

K. L. Larsen et al.: "Optimized Macro Mobility within the 3GPP IP Multimedia Subsystem," Computing in the Global Information Technology, 2006. ICCGI 2006. International Multi-Conference on Bucharest, Romania Aug. 1-3, 2006, Piscataway, NJ, USA, IEEE, Jul. 1, 2006.

S. Yang et al.: "SIP Multicast-Based Mobile Quality-of-Service Support over Heterogeneous IP Multimedia Subsystems," IEEE Transactions on Mobile Computing, IEEE Service Center, Los Alamitos, CA, US, vol. 7, No. 11, Nov. 1, 2008, pp. 1297-1310.

C. Politis et al. (N. Akhtar et al.): "Hybrid Multilayer Mobility Management with AAA Context Transfer Capabilities for All-IP Networks," IEEE Wireless Communications, IEEE Service Center, Piscataway, NJ, USA, vol. 11, No. 4, Aug. 1, 2004, pp. 76-88.

N. Banerjee et al.: "Analysis of SIP-based mobility management in 4G wireless networks," Computer Communications, Elsevier Science Publishers BV, Amsterdam, NL, vol. 27, No. 8, May 1, 2004, pp. 697-707.

* cited by examiner

METHOD FOR ENSURING CONTINUITY DURING THE MANAGEMENT OF COMMUNICATION SESSIONS OPERATED FROM A FOURTH-GENERATION MOBILE TERMINAL

CROSS-REFERENCE TO RELATED APPLICATIONS

This application is a National Stage of International patent application PCT/EP2010/067121, filed on Nov. 9, 2010, which claims priority to foreign French patent application No. FR 09 05791, filed on Dec. 1, 2009, the disclosures of each of which are incorporated by reference in their entireties.

FIELD OF THE DISCLOSED SUBJECT MATTER

The present invention relates to a method for ensuring the continuity of the management of communications sessions operated from a fourth-generation mobile terminal. It applies notably to WiMAX or LTE ("Long-Term Evolution") networks to allow the continuity of a connection-oriented application signaling and data session and using in particular the SIP protocol ("Session Initiation Protocol"), for example VoIP, in the event of the movements of mobile terminals.

BACKGROUND

The computer networks used by fourth-generation (4G) mobile terminals include radio sub-networks, sometimes referred to by the abbreviation RAN ("Radio Access Network"), which are connected to an interconnection network, also referred to as a CSN ("Connectivity Service Network"), the CSN being able to be connected to the Internet. A fourth-generation mobile terminal is identified by an IP ("Internet Protocol") address that allows it to receive and transmit data across the entire computer network. The mobile terminal is within the coverage area of an antenna station, also referred to as a base station. An RAN is formed by a set of base stations, the coverage areas of which complement one another to cover an area. The data are transmitted between the mobile terminal and the base station in the form of radio waves, then the base station transmits the data, generally via cables or optical fibers, to a gateway serving as the interface between an RAN and a CSN. As a general rule, a plurality of base stations are controlled by the same gateway. A gateway of this type performs a variety of functions, notably packet filtering, quality of service management, user authentication and base station control. For the sake of simplification, the gateway term ASN-GW ("Access Service Network Gateway") will be used below to refer to the gateways present in the WiMax networks; however, this term must not be interpreted in a limiting manner, since the invention can apply to all types of fourth-generation networks.

When the mobile terminal moves and leaves the zone covered by a first base station within the coverage area of which it was situated, communications are provided by a second base station whose coverage area is adjacent to the first. If the second base station is connected to the same ASN-GW gateway as the first base station, the term micro-mobility is used. In the case where the second base station is connected to an access ASN-GW gateway different from the first ASN-GW gateway, the term macro-mobility is used. The present invention relates more particularly to continuity of the management of communications in the context of the micro-mobility of the mobile terminals.

The communications sessions management allows a call negotiation protocol to be run between two users, aiming to ensure that these two users have the means to dialogue with one another before a call is set up (for example setting up a coherent encoder/decoder at both ends of the line). This management can be carried out using a protocol operating on a client-server architecture. For example, the SIP protocol is based on an interworking between a client software module installed on a terminal and an SIP server present in the CSN.

SUMMARY

One object of the invention is to propose a method for ensuring the continuity of the management of an established communications session, in the application layers, on a network of fourth-generation mobile terminals. For this purpose, the subject-matter of the invention is a method for ensuring the continuity of the management of one or more communications sessions operated from a fourth-generation mobile terminal communicating on an IP network, said network including at least one radio network provided with a plurality of base stations with which said terminal is capable of communicating, said radio network being linked via access gateways to an interconnection network provided with communications session management application servers, the sessions of a mobile terminal being managed by one of said servers, the method being characterized in that it comprises at least the following steps:

in the event of the movement of the mobile terminal resulting in a change of access gateway, transmitting an alert message to a new management server;

the new management server transmits an interrogation request to the other servers in order to recover the call context of the mobile terminal from the server which managed the sessions of said terminal prior to the movement of the terminal;

the new server transmits an invitation message to the mobile terminal accompanied by connection parameters, in such a way that said terminal can connect to said new server.

The communications sessions which were in progress can therefore be managed by the new server, without interruption of communications. The method according to the invention is particularly advantageous in distributed networks.

According to one embodiment of the method according to the invention, the application servers include at least two IP addresses, a first address, identical for all servers, being used to access said servers from the mobile terminal, a second IP address being used to address the servers within the interconnection network.

According to one embodiment of the method according to the invention, the alert message is transmitted by the new gateway in charge of the mobile terminal to the SIP server closest to said new gateway.

According to one embodiment of the method according to the invention, the session management protocol is the "Session Initiation Protocol", the mobile terminal comprising an SIP client module, the communications management servers comprising an SIP server module.

According to one embodiment of the method according to the invention, the invitation message transmitted by the new management server to the terminal is a "re-invite" or "update" message.

According to one embodiment of the method according to the invention, the mobile terminals communicate according to a "group call" call mode. "Group call" applications, also referred to as "push-to-talk" applications, require a substantial volume of signaling data. For this reason, the use of the method according the invention for this type of application is particularly advantageous.

The subject-matter of the invention is also a session management server implementing the method as described above, said server including at least one mobility manager capable of recovering the call context of the mobile terminal from a different management server.

The subject-matter of the invention is also an IP communications network including at least one radio network provided with a plurality of base stations with which the fourth-generation mobile terminals are capable of communicating, said radio network being linked via access gateways to an interconnection network provided with communications session management application servers, said servers being provided with at least two IP addresses, a first address, identical for all servers, being used to access said servers from the mobile terminals, a second IP address being used for addressing within the interconnection network.

According to one embodiment of the IP communications network, each base station comprises a communications session management server. The distribution of the management servers allows the reliability of the network to be increased.

According to one embodiment of the IP communications network, the communications session management servers are servers running the "Session Initiation Protocol".

The method according to the invention notably prevents the session management from being definitively linked to one and the same management server.

According to one advantageous embodiment, the SIP servers are distributed as close as possible to the radio base stations, so that the risks of service interruption reduced. For some networks, designed as distributed, the method according to the invention achieves a reliable and continuous management of the communications sessions set up via mobile terminals. By the same token, the method according to the invention enables the transformation of a network, the initially provided session management of which is centralized, to render this management distributed and thus render the network less vulnerable to possible malfunctions.

BRIEF DESCRIPTION OF THE DRAWINGS

Other characteristics are explained in the following detailed description, provided by way of a non-limiting example and referring to the attached drawings, in which.

For the sake of clarity, the same references in different figures denote the same objects.

DETAILED DESCRIPTION

Figure 1A:
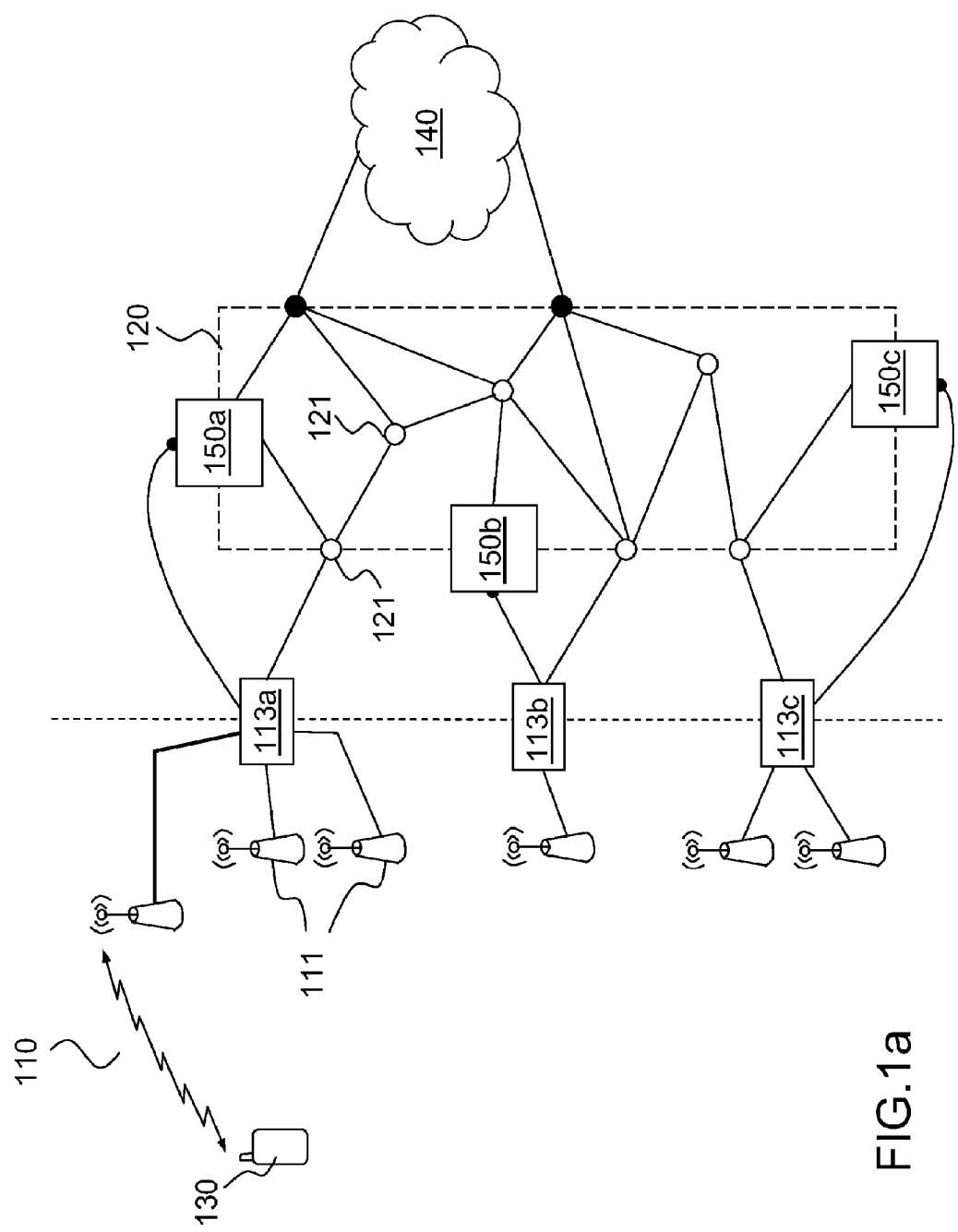
FIG. 1a is a diagram illustrating a first example of a 4G network on which the method according to the invention can be implemented.

FIG. 1a is a view presenting a first example of a network on which the method according to the invention can be implemented. A 4G communications network 100 includes a radio network 110 referred to below as RAN, and an interconnection network or CSN 120, formed, for example, from line-connected communications links or radio links or other links. The CSN includes SIP servers 150a, 150b, 150c. In the example, the CSN 120 is connected to the Internet network 140 via routers 121. The RAN 110 includes a plurality of radio base stations 111 distributed to cover an area. Thus, the 4G communications network 100 allows mobile terminals present in this area to communicate with other terminals connected to the 4G network 100. A mobile terminal 130 is, for example, a telephone, a portable computer or any other mobile device capable of communicating via the 4G network 100.

Figure 2:
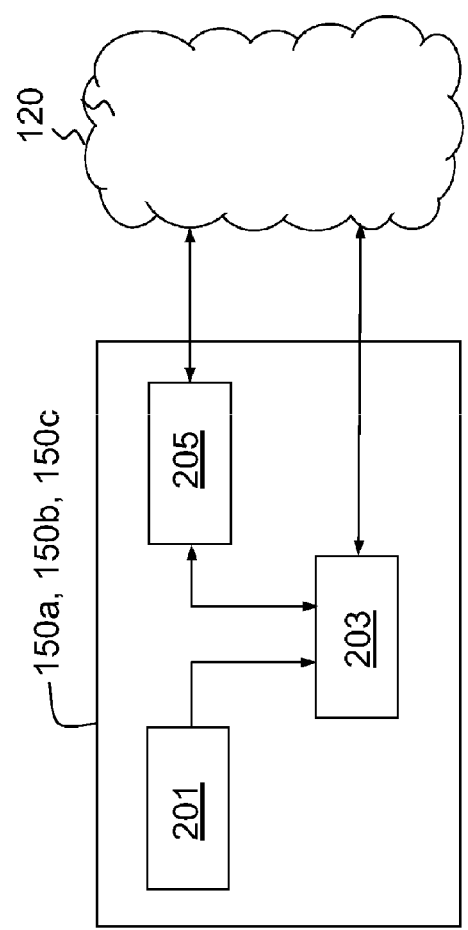
FIG. 2 is a diagram illustrating an example of the functional architecture of a session management server implementing the method according to the invention.

FIG. 2 is a diagram illustrating a non-limiting example of the architecture of a session management server implementing the method according to the invention, In the example, the management server 150a, 150b, 150c is an SIP server which includes a mobility manager 201, a session controller 203 and a local database 205. The mobility manager 201 allows the other SIP servers to be alerted in the event of mobility of a mobile terminal managed by the SIP server 150a, 150b, 150c; it also allows the call contexts to be recovered in the event of taking charge of a new communications session. The session controller 203 enables the management of a session in the event of a new communications session being taken in charge. The local database 205 is a database replicated from one SIP server to another. This database 205 notably contains the user rights. Each SIP server has at least two IP addresses. A first IP address, from the perspective of the mobile terminals, is identical for all SIP servers, and a second IP address is used to identify each SIP server within the CSN 120. The fact that the first IP address is identical for all SIP servers means that the mobile terminal does not have to change, in its configuration, the address of the SIP server with which it is registered, such a change moreover being impossible for the SIP protocol. From the perspective of the mobile terminal, the SIP server change is therefore transparent.

Figure 3:
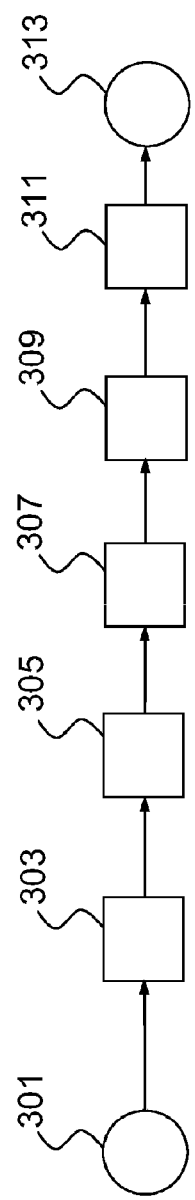
FIG. 3 is a state diagram illustrating the steps of a method according to the invention.

FIG. 3 is a state diagram illustrating the steps of a method according to the invention. The steps are described in relation to the network shown in FIG. 1b and the server architecture shown in FIG. 2.

In an initial state 301, a subscribed user is registered with a communications session management server, in the example an SIP server 150a. The subscriber has already set up a call session with another subscriber on the network via a mobile terminal 130.

In the data link layer (for example Ethernet) and the network layer (IP), mechanisms are put in place to ensure the continuity of the communications operated from the mobile terminal 130 in the event of macro-mobility, for example via the following method: in the event of a change of ASN-GW access gateway, the new access gateway 113b with which the terminal 130 is associated broadcasts a message on the interconnection network 120 comprising at least the IP address of the terminal 130 and the level 2 address of said new access gateway 113b, the other access gateways 113a, 113c of the network registering the correspondence between said IP address and said level 2 address of the new access gateway 113b.

However, this mechanism is insufficient to guarantee that the communications session management services continue to function in the event of a macro-mobility 320 of the mobile terminal 130 of the subscriber. While the subscriber remains in the zone covered by the initial base station which permitted the initialization of a session, the risks of interruption of the session management service remain limited because the SIP server 150a managing the communications sessions of the subscriber is, a priori, close to the access gateway 113a that is used. However, when the terminal 130 moves away from its initial base, the risks of the SIP server 150*a* no longer being accessible from the new access gateway 113*b* increase.

When the mobile terminal 130 moves to the point where it has to change access gateways, the new access gateway 113*b* transmits, 303, a mobility alert message to an SIP server 150*b*, generally the closest to the new access gateway 113*b*. In the example, the level 2 message broadcast across the CSN interconnection network 120 by the new access gateway 113*b* in charge of the mobile terminal 130 is re-used; this message is regarded as a mobility alert message for the SIP servers; for this reason, it is received by the mobility manager 201 of the SIP server 150*b*.

Figure 1B:
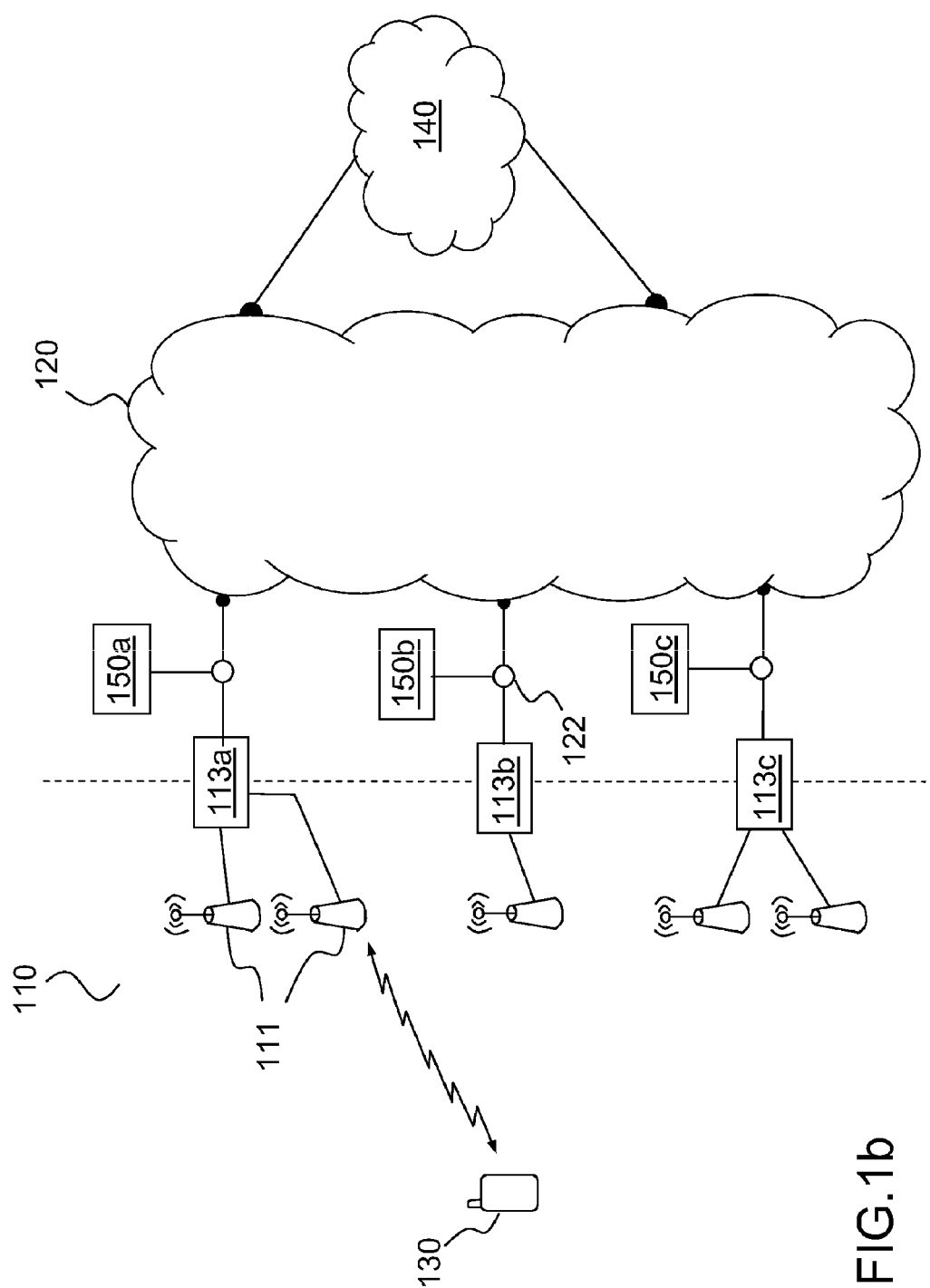
FIG. 1b is a diagram illustrating a second example of a 4G network on which the method according to the invention can be implemented.

According to one embodiment shown in FIG. 1*b*, each SIP server 150*a*, 150*b*, 150*c* has a corresponding access gateway 113*a*, 113*b*, 113*c*. Thus, the SIP server 150*b* is connected to the same site switch or router 122 as the new access gateway 113*b*, said switch or router being configured to redirect the alert message broadcast by the new gateway 113*b* directly towards the SIP server 150*b*, said server 150*b* in turn alerting the other SIP servers 150*a*, 150*c*, via a different message.

The session controller of the new SIP server 150*b* in charge of the mobile terminal 130 transmits, 305, an interrogation request destined for a multicast address to which the SIP servers 150*a*, 150*b*, 150*c* of the CSN 120 are subscribed in such a way as to determine which of the SIP servers was in charge of the session management prior to the macro-mobility event. Once the SIP server 150*a* which managed the session prior to the macro-mobility event receives this request, it transmits, 307, for example via its mobility manager 201, to the new SIP server 150*b* in charge of the session, the call context linked to the communications sessions in progress on the mobile terminal of the subscriber. This call context is a set of parameters including notably the session identifiers and their characteristics such as, for example, the allocated bandwidth, the required quality of service; if required by the nature of the communications, the call context also includes authentication keys used by the base station. According to one embodiment of the method according to the invention, the session controller recovers, from the local database, the data associated with the subscriber of the mobile terminal 130, for example the rights assigned to said subscriber. Thus, the session controller of the new SIP server has both the user data and the call context.

The session controller then transmits, 309, a "re-INVITE" invitation message to the SIP client run by the mobile terminal of the subscriber. According to a different implementation of the method according to the invention, the invitation message may be an "update" message. The invitation message includes the new connection parameters for the call in progress, these parameters including notably the IP address of the SIP server and the logical ports to which the mobile terminal must connect in the SIP server to transport the data and signaling flows, for example the RTP ("Real-time Protocol") and RTCP ("Real-time Control Protocol") flows. These parameters may be transmitted in the form of messages in the SDP ("Session Description Protocol") format.

The mobile terminal 130 of the subscriber receives these connection parameters and consequently modifies, 311, its configuration in such a way as to communicate with the session controller of the new SIP server.

At the end of the performance of the method according to the invention, 313, the subscriber is connected to a new SIP server which ensures the continuity of the management of the sessions created for the mobile terminal 130.

One advantage of the method according to the invention is that it requires no modification of the SIP clients, in other words no intervention on the mobile terminals.

The invention claimed is:

1. A method for ensuring continuity of management of communications sessions operated from a fourth-generation mobile terminal communicating on an IP network, said network including at least one radio network provided with a plurality of base stations with which said terminal is capable of communicating, said radio network being linked via access gateways to an interconnection network provided with communications session management application servers, said communication session management servers being SIP servers, the sessions of a mobile terminal being managed by one of said servers, said communications session management application servers including at least two IP addresses, a first address, identical for all servers, being used to access said servers from the mobile terminal, a second IP address being used to address the servers within the interconnection network, the method comprising:

in the event of a movement of the mobile terminal resulting in a change of access gateway, transmitting an alert message to a new communications session management server, said alert message being transmitted by the new gateway in charge of the mobile terminal to the SIP server closest to said new gateway;

said new server transmits an interrogation request destined for a multicast address to which said SIP servers are subscribed in order to recover the call context of the mobile terminal from the server which managed the sessions of said terminal prior to its movement; and the new session management server transmits an invitation message to the mobile terminal accompanied by connection parameters, in such a way that said terminal can connect to said new server, wherein said server including at least one mobility manager capable of recovering the call context of the mobile terminal from a different management server, wherein the mobile terminals communicate according to a "group call" call mode.

2. The method as claimed in claim 1, wherein the session management protocol is the Session Initiation Protocol (SIP), the mobile terminal comprising an SIP client module, the communications management servers comprising an SIP server module.

3. The method as claimed in claim 2, wherein the invitation message transmitted by the new management server to the terminal is a "re-invite" or "update" message.

4. An IP communications network including at least one radio network provided with a plurality of base stations with which the fourth-generation mobile terminals are capable of communicating, said radio network being connected via access gateways to an interconnection network provided with communications session management application servers, wherein said servers are provided with at least two IP addresses, a first address, identical for all servers, being used to access said servers from the mobile terminals, a second IP address being used for addressing within the interconnection network, said servers being configured to implement the method as claimed in claim 1.

5. A network as claimed in claim 4, in which each base station comprises a communications session management server.

6. The network as claimed in claim 4, in which the communications session management servers are servers running the Session Initiation Protocol (SIP).

7. A method for ensuring continuity of management of communications sessions operated from a fourth-generation mobile terminal communicating on an IP network, said network including at least one radio network provided with a plurality of base stations with which said terminal is capable of communicating, said radio network being linked via access gateways to an interconnection network provided with communications session management application servers, the sessions of a mobile terminal being managed by one of said servers, the method comprising:

- in the event of a movement of the mobile terminal resulting in a change of access gateway, transmitting an alert message to a new communications session management server;
- said new server transmits an interrogation request to, at least, the session management servers of said interconnection network different from said new server in order to recover the call context of the mobile terminal from the server which managed the sessions of said terminal prior to its movement; and
- the new session management server transmits an invitation message to the mobile terminal accompanied by connection parameters, in such a way that said terminal can connect to said new server,
- wherein said server including at least one mobility manager capable of recovering the call context of the mobile terminal from a different management server, and
- wherein the mobile terminals communicate according to a "group call" call mode.

* * * * *